(No Model.)

J. D. HULL.
ATTACHMENT FOR HARNESS.

No. 568,762. Patented Oct. 6, 1896.

Witnesses
G. E. Martin
L. E. Potter

Inventor.
Jedediah D. Hull.
By N. B. Hagin.
atty.

UNITED STATES PATENT OFFICE.

JEDEDIAH D. HULL, OF EL DORADO, KANSAS.

ATTACHMENT FOR HARNESS.

SPECIFICATION forming part of Letters Patent No. 568,762, dated October 6, 1896.

Application filed May 7, 1896. Serial No. 590,638. (No model.)

*To all whom it may concern:*

Be it known that I, JEDEDIAH D. HULL, a citizen of the United States of America, residing at El Dorado, in the county of Butler and State of Kansas, have invented certain new and useful Improvements in Attachments for Harness, of which the following is a specification, reference being had therein to the accompanying drawings, and the figures of reference thereon, forming a part of this specification, in which—

Figure 1:
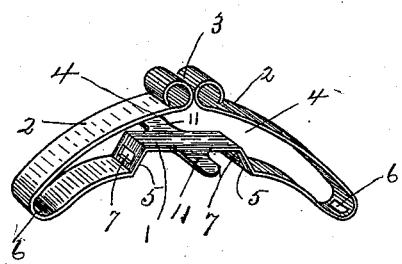
Figure 2:
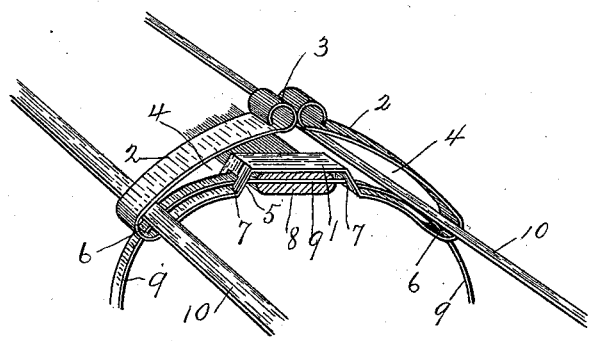
Figure 2:
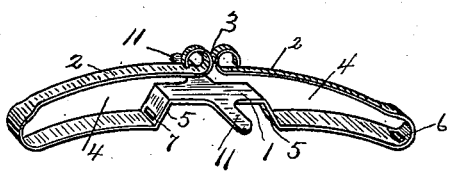

Figure 1 is a perspective view of my attachment for harness. Fig. 2 is a like view of said attachment, showing how it is attached to a harness, also the lines in place. Fig. 3 is a like view of said attachment, showing the arms 2 narrower than is shown in Fig. 1.

This invention relates to certain improvements in harness attachments; and it consists in spring-keepers secured to the back-strap and hip-strap of the harness; and its object is to provide a means of preventing the lines from falling down on the sides of the horse, preventing the horse from throwing his tail over the line.

Referring to the drawings, 1 represents my attachment for harness for holding the lines.

2 represents spring-keepers, which come together at 3, forming the upper part of the loop 4, which is for the purpose of holding the lines from dropping down.

5 represents a raised portion in said attachment for allowing the turnback-strap 8 to pass through.

6 and 7 represent openings in the attachment to allow the hip-strap 9 to pass through, as shown in Fig. 2, for holding said attachment in place.

10 represents the lines passing through the loop 4 of said attachment.

11 represents arms projecting out from either side of the attachment 1 for preventing said attachment from falling backward or forward.

In putting the lines in or taking them out the spring portions 2 are raised up, which separates them at 3, thus allowing the lines to pass through.

When it is desired to remove the attachment from the harness, the loose ends of the hip-strap 9 are slipped through the openings 6 and 7, which releases the attachment.

Having thus described my invention, what I claim as new and useful, and desire to secure by Letters Patent, is as follows:

In combination with the turnback-strap, and the hip-strap of a harness, the line-holding attachment made of one piece of spring metal, having the raised portion, provided with the lips 11, the openings 6 and 7 through which said hip-strap passes, the spring-arms touching at their free ends forming one complete loop.

JEDEDIAH D. HULL.

Witnesses:
M. S. HINMAN,
J. S. MARTIN.